No. 749,334. PATENTED JAN. 12, 1904.
O. W. & L. E. SIEBENHAAR.
FERTILIZER DISTRIBUTER.
APPLICATION FILED AUG. 20, 1903.
NO MODEL. 3 SHEETS—SHEET 1.
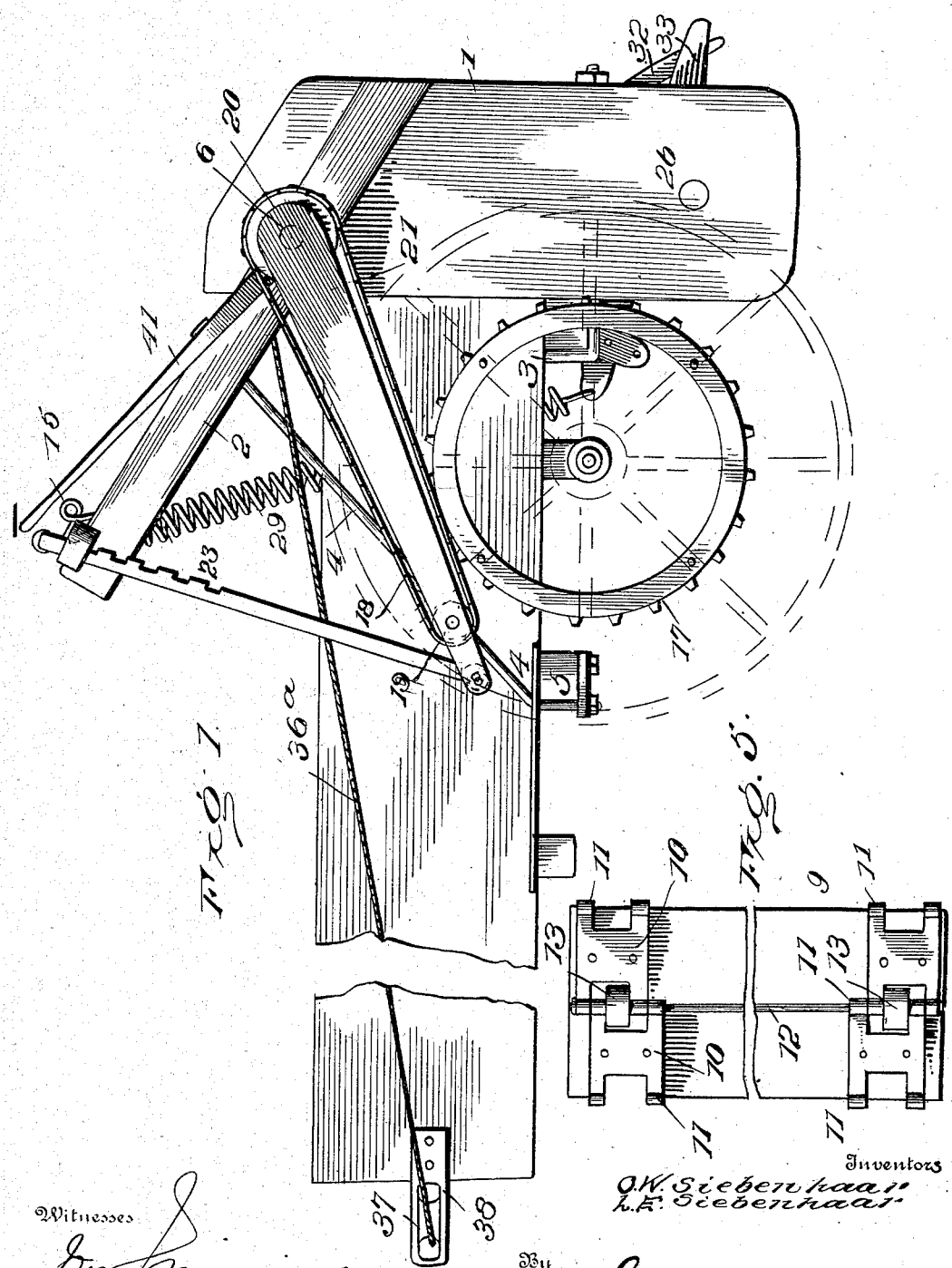

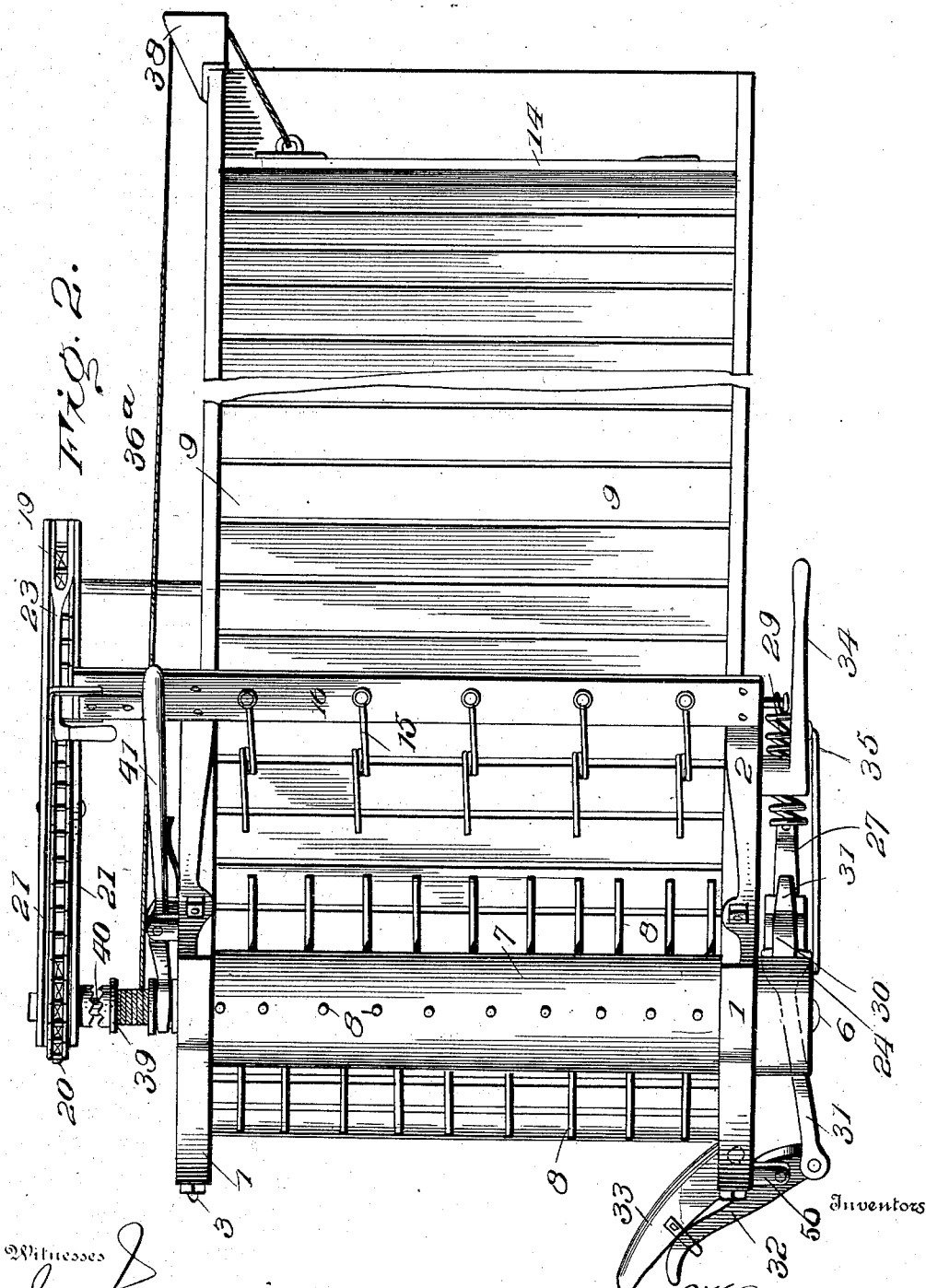

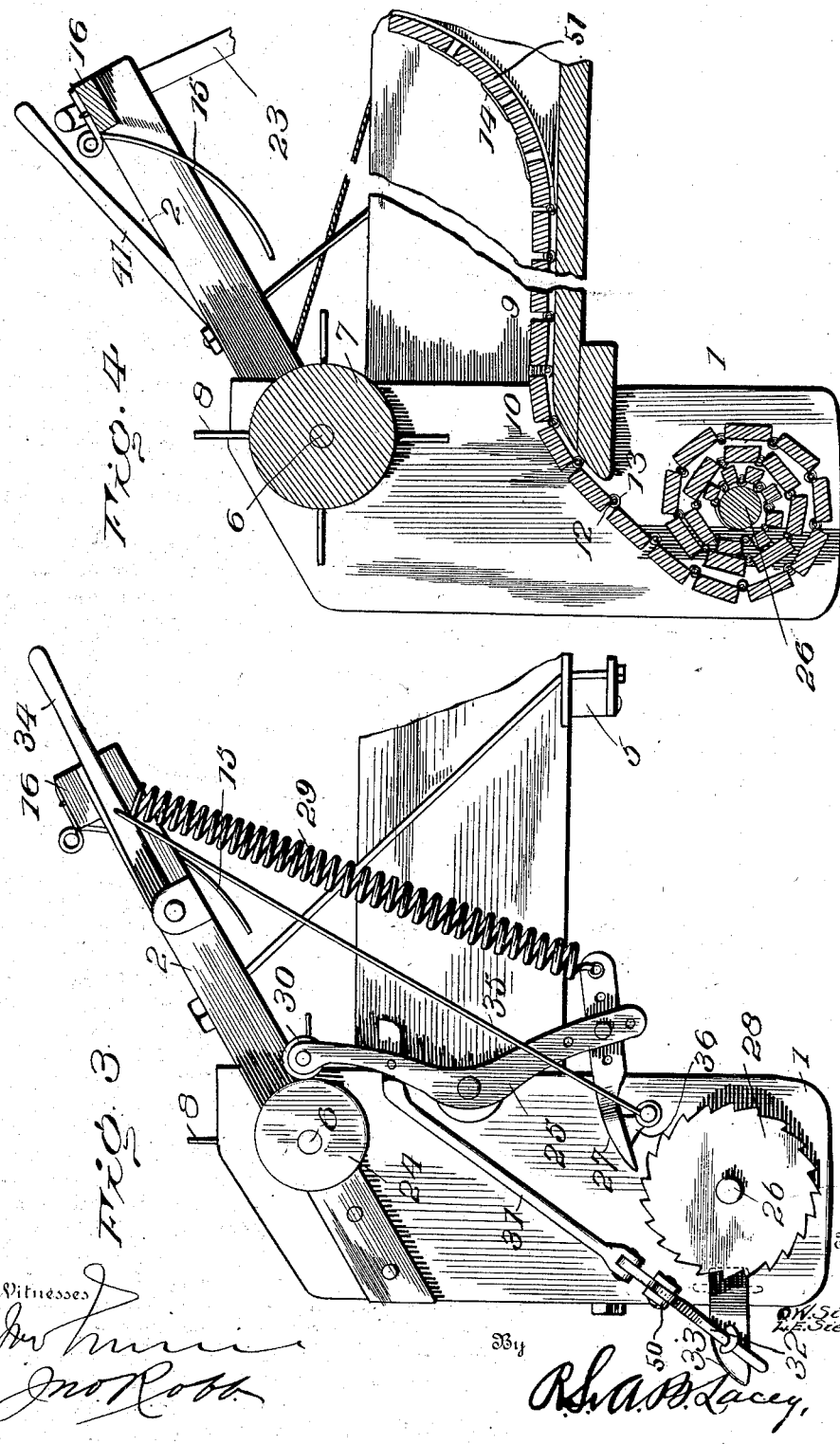

No. 749,334. Patented January 12, 1904.

UNITED STATES PATENT OFFICE.

OTTO W. SIEBENHAAR AND LOUIS E. SIEBENHAAR, OF ROSENDALE, WISCONSIN.

FERTILIZER-DISTRIBUTER.

SPECIFICATION forming part of Letters Patent No. 749,334, dated January 12, 1904.

Application filed August 20, 1903. Serial No. 170,218. (No model.)

*To all whom it may concern:*

Be it known that we, OTTO W. SIEBENHAAR and LOUIS E. SIEBENHAAR, citizens of the United States, residing at Rosendale, in the county of Fond du Lac and State of Wisconsin, have invented certain new and useful Improvements in Fertilizer-Distributers, of which the following is a specification.

This invention is an attaching mechanism adapted to be applied to the common form of farm-wagons for use in distributing fertilizer. The mechanism includes a supporting-frame attachable to the rear of a farm-wagon by suitable means, carrier mechanism to be disposed within the body of the wagon for feeding the fertilizer without the rear end of the wagon, and special feed-regulating devices for insuring a continuous, steady, and even feed of the fertilizer, which is in this instance manure.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of the wagon, showing the attaching mechanism applied thereto. Fig. 2 is a top plan view of a wagon-body, illustrating the attachment disposed thereon. Fig. 3 is a side elevation of the rear portion of a wagon, showing the mechanism carried by one side of the supporting-frame. Fig. 4 is a longitudinal sectional view showing the arrangement of the carrier and feeder devices more especially. Fig. 5 is a detail view of the special manner of connecting the sections of the carrier-apron.

Corresponding and like parts are referred to in the following description and indicated in all the views of the drawings by the same reference characters.

The supporting-frame comprises the spaced uprights 1 and the forwardly and upwardly extending arms 2. The supporting-frame is secured to the rear end of the wagon by hook-bars 3, carried by the uprights 1, and connecting-bars 4, which pass through the arms 2 and are removably secured to a cross-beam 5 or analogous part upon the wagon. A shaft 6 extends transversely of the uprights 1, and upon the shaft 6 is disposed a cylinder 7, which is provided with teeth 8, projected therefrom and which positively feed the fertilizer from the carrier 9. The carrier 9 comprises an apron of common form, consisting of a series of pivotally-connected sections. The sections of the carrier are connected by a means consisting of rigidly-disposed plates 10, located upon the under sides of the sections and provided with journals 11. The journals 11 receive the pivot-bar 12, which connects the said sections, and the rollers 13 are mounted between the journal portions of the plates. The rollers 13 being upon the under side of the carrier relieve the friction and permit steady movement of the carrier as the cylinder feeds the fertilizer from the wagon. The rear end portion of the carrier 9 is upwardly turned, as shown at 14, and held in such position by stiffener-bars 51, so as to prevent escape of the fertilizer from the forward end of the carrier as the same is feeding. Retarder-arms 15 are extended downwardly from a cross-bar 16, which connects the upper ends of the arms 2. A gear-wheel 17 is secured to one of the rear wheels of the wagon, as shown most clearly in Fig. 1, and this gear-wheel communicates motion to the shaft 6 through the medium of a drive-chain 18, which drive-chain passes over cog-wheels 19 and 20, the cog-wheel 19 being journaled in a frame 21 and the cog-wheel 20 keyed to the shaft 6, which actuates the cylinder 7. Any suitable mechanism may be employed for moving the drive-chain 18 away from the toothed periphery of the element 17, so as to discontinue the operation of the feed mechanism entirely. The means utilized herein, and shown in the drawings, comprises the pivot-frame 21, which carries the wheel 19, over which the drive-chain 18 passes. A notched lift-bar 23 is pivoted to the lower end of the frame 21 and may be adjusted in a manner readily comprehended, so as to support the chain 18 in such a position as to prevent actuation thereof by the gear-wheel 17. The cylinder 7 is revolved by means of the drive-chain 18, above described, and the carrier 9 is also actuated through intermediate elements by the shaft 6 in the feeding operation. An eccentric roller 24 is mounted upon the end of the shaft 6 opposite the cog-wheel 20 and is adapted to actuate a pivoted actuating-lever 25. A winding-drum 26 is disposed below the cylinder 7, being mounted for rotation in the uprights 1. The winding-drum 26 as it rotates causes movement of the carrier 9 toward the rear of the wagon, said carrier winding upon the said drum. The actuating-lever 25 is provided upon its lowermost portion with a dog 27, which dog 27 engages a ratchet-wheel 28, mounted upon an end portion of the winding-drum, projected from the outer side of one of the uprights 1. The actuating-lever 25 is actuated by the eccentric roller 24 and in turn, through the medium of the dog 27, causes revolution of the winding-drum, and thereby feeding movement of the carrier 9. A spring 29, secured to one of the arms 2 at one end and at the opposite end to the dog 27, normally causes engagement of the dog with the ratchet-wheel 28, at the same time maintaining the actuating-lever 25 in coöperating relation with the eccentric roller 24 at its normal position. The upper portion of the actuating-lever 25 is bifurcated, and between the bifurcated portion is journaled a roller 30 for contact with the periphery of the eccentric roller 24, being employed for obvious purposes.

A feed-regulator bar 31 has its upper end extended between the bifurcated portion of the actuating-lever 25 and has its lower end pivoted to a lever 32, pivoted in brackets 50 of the uprights 1, which is actuated by a pivot contact-bar 33. The regulator-bar 31 is actuated by the contact-bar 33, which latter bar is directly actuated by the carrier 9 as the same winds upon the drum 26. As the carrier winds upon the drum 26 in the operation of feeding the fertilizer from the wagon the size of the roll upon the drum necessarily increases, so that it is necessary to provide some means for regulating the feed of the carrier which would under ordinary conditions move faster as the carrier winds upon the drum 26. The regulator-bar 31 is provided to regulate the feed so as to feed evenly and steadily. Said bar as the carrier winds upon the drum 26 gradually moves the upper end of the actuating-lever 25 away from the eccentric roller 24, so that the said roller does not give the actuating-bar 25 as great a movement as when the carrier 9 begins to feed the fertilizer. As before mentioned, the bar 32, being itself actuated by the contact-bar 33, which is engaged by the carrier, moves the actuating-lever 25 a distance dependent upon the movement of the carrier. When the actuating-lever is at its limit of movement under the actuation of the bar 31, the dog 27 is disposed in such a position as to very slowly rotate the drum 26, the movement of the drum being thus regulated so as to continue its revolution at the same speed at all times.

As shown clearly in Fig. 2, the contact-bar 33 is pivoted to one of the supports 1 and is connected intermediate its ends to the outer end portion of the lever 32, the latter, as before described, being pivotally mounted in brackets 50, projected from the support 1. The opposite end of the lever 32 is pivoted to the bar 31 and coöperates with the actuating-lever 25 to throw the latter toward and from the eccentric roller 24. As the size of the carrier-apron 9 upon the drum 26 increases the same moves into contact with the bar 33, gradually moving the same rearwardly as the contact-bar 33 is actuated rearwardly. The element 32 is at the same time actuated so as to operate the bar 31, which connects with the actuating-lever 25. The operation as above slowly causes movement of the actuating-lever 25 away from the eccentric roller, so that the increasing size of the portion of the apron 9 upon the drum 26 so regulates the position of the lever 25 that the same is moved under the actuation of the eccentric roller 24 a distance determined by the size of the wound portion of the apron. Thus as the wound portion of the apron upon the drum gradually increases in size the range of movement of the lever 25 correspondingly decreases, and since the lever 25 is the actuating means by which the drum is rotated it will be readily seen that the above operation regulates the feed of the apron as the same carries the fertilizer toward the rear end of the wagon-body.

When it is desired to temporarily throw the feed mechanism out of operation, the lever 34 may be operated so as to throw the dog 27 out of engagement with the ratchet-wheel 28. The lever 34 is connected, by means of a rod 35, to a pivoted piece 36, which serves to lift the dog 27 under the actuation of the lever 34.

After the carrier 9 has been wound upon the drum and all the fertilizer fed from the wagon it is necessary to place the carrier 9 in its original position to receive the fertilizer thereon preparatory to again feeding the same from the vehicle. To accomplish this, a connection 36ª is connected to the forward end of the carrier and passing around a pulley 37, projected from a bracket 38 upon the frame, extends from a spool 39, which is mounted upon the shaft 6, adjacent the cog-wheel 20. A clutch device 40 serves to cause rotation of the spool 39 when the clutch elements thereof are thrown into engagement by operation of the lever 41. The shaft 6 being positively rotated by the drive-chain 18 is thus made to communicate its motion to the spool 39, and thereby causes revolution of the latter. The revolution of spool 39 winds the connection 36ª thereupon, and this reverses the movement of the carrier, restoring the same to its normal position occupying the bed of the wagon-body. As soon as the carrier has regained the position aforesaid the clutch elements of the clutch 40 are thrown out of engagement with each other, thereby preventing actuation of the spool 39. The retarder-arms 15 serve to prevent lumping of the fertilizer and choking of the feed as the same passes to the cylinder.

Having thus described the invention, what is claimed as new is—

1. In a fertilizer-distributer, the combination, with a positively-driven shaft, a feed-cylinder mounted upon the shaft for actuation thereby, a carrier-apron for feeding the fertilizer, an actuating-lever for coöperation with the shaft to cause feeding movement of the carrier-apron, and means regulable by the carrier-apron for adjusting the relative position of the actuating-lever with reference to the shaft for evenly feeding the fertilizer.

2. In a fertilizer-distributer, the combination with a driven shaft, a feed-cylinder, a carrier-apron for feeding the fertilizer, means for coöperation with the driven shaft to cause feeding movement of the carrier-apron, and means regulable by the carrier-apron for actuation of the means aforesaid to regulate the movement of the said apron to thereby cause even feed of the fertilizer.

3. In a fertilizer-distributer, the combination, with a positively-driven shaft, a feeding-cylinder mounted upon the shaft and provided with feeder devices, an eccentric roller carried by one end of the shaft, a carrier-apron for feeding the fertilizer, a drum adapted to have the carrier-apron wind thereon to cause feeding movement thereof, an actuating-lever disposed so as to be actuated by the eccentric roller aforesaid and adapted to cause rotation of the winding-drum aforesaid, and means regulable by the carrier-apron for actuation of the actuating-lever aforesaid to adjust its position with reference to the eccentric roller so as to cause even feed of the fertilizer by the carrier.

4. In a fertilizer-distributer, and in combination, with a positively-driven shaft, a cylinder mounted thereon provided with feeder devices, an eccentric roller disposed upon one end of the shaft, a drum disposed adjacent the cylinder aforesaid, a carrier-apron adapted to be wound upon the drum aforesaid in feeding the fertilizer, an actuating-lever coöperating with the eccentric roller to cause actuation of the drum and feeding of the carrier-apron, and a regulator-bar actuated by the carrier-apron and adapted to adjust the position of the actuating-lever with reference to the eccentric roller so as to cause even feed of the fertilizer by the carrier-apron.

5. In a fertilizer-distributer, and in combination, with a positively-driven shaft, an eccentric roller mounted upon one end of the shaft, a cylinder disposed upon the shaft provided with feeder devices, a drum disposed adjacent the aforesaid cylinder, a carrier-apron adapted to be wound upon the drum in feeding the fertilizer, an actuating-lever having one end in engaging relation with the eccentric roller, actuating means carried by the other end of the said lever for causing rotation of the winding-drum, and a regulator-bar actuated by the carrier and adapted to adjust the position of the end of the actuating-lever adjacent the eccentric roller so as to cause even feeding of the carrier-apron upon the winding-drum.

6. In a fertilizer-distributer, and in combination, with a positively-driven shaft, a cylinder mounted thereon and provided with feeder devices, an eccentric roller mounted upon one end of the said shaft, a drum, a carrier-apron for feeding the fertilizer adapted to be wound upon the drum in its feeding movement, an actuating-lever for coöperation with the eccentric roller to cause actuation of the drum in the feeding operation, regulator means for coöperation with the said actuating-lever to cause even feeding of the fertilizer by the carrier, and spring means coöperating with the actuating-lever to normally hold the same in engaging relation with the eccentric roller.

7. In a fertilizer-distributer, and in combination, with a positively-driven shaft, a cylinder mounted thereon and provided with feeder devices, an eccentric roller carried by the shaft, a drum disposed adjacent the cylinder, a carrier-apron for feeding the fertilizer adapted to be wound upon the drum, an actuating-lever adapted for actuation by the eccentric roller to cause rotation of the drum and feeding movement of the carrier-apron, a drum-actuating device carried by the said lever, and spring means coöperating with the said drum-actuating device to normally hold the same in engaging position relative to the drum and normally hold the actuating-lever in coöperating relation relative to the eccentric roller.

8. In a fertilizer-distributer, and in combination, with a positively-driven shaft, a feeding-cylinder mounted thereon, an eccentric roller carried by the said shaft, a drum mounted adjacent the shaft, a carrier-apron for feeding the fertilizer and adapted to be wound upon the drum, a ratchet-wheel for actuation of the drum, an actuating-lever coöperating with the eccentric roller, a dog carried by the said lever for engaging the ratchet-wheel of the drum to cause rotation of the latter and winding of the carrier thereon, a regulator-bar coöperating with the actuating-lever to adjust its position relative to the eccentric roller so as to cause normal and even feeding of the fertilizer by the carrier, and a contact-bar connected to the regulator-bar and directly actuated by the carrier.

9. In a fertilizer-distributer, and in combination, with a positively-driven shaft, a cylinder mounted thereon and provided with feeder devices, an eccentric roller mounted upon the shaft, a drum disposed adjacent the cylinder and a ratchet-wheel for actuation of the drum, a carrier-apron for feeding the fertilizer and adapted to be wound upon the drum in its feeding movement, an actuating-lever operable by the eccentric roller aforesaid, a dog carried by the lever for engagement with the ratchet-wheel of the drum to cause actuation of the latter, a regulator-bar for regulating the position of the actuating-lever relative to the eccentric roller so as to cause even feeding of the fertilizer by the carrier, a contact-bar for engagement by the carrier to cause actuation of the regulator-bar, spring means for holding the actuating-lever normally in engagement with the eccentric roller aforesaid, and means connecting the carrier-apron with the positively-driven shaft for reversing the movement of the carrier-apron and to unwind the same from the drum.

10. In a fertilizer-distributer, and in combination, with a positively-driven shaft, a cylinder mounted thereon and provided with feeder devices, a drum disposed adjacent the cylinder having a ratchet-wheel adjacent thereto for actuation thereof, a carrier-apron adapted to wind upon the drum, an actuating-lever coöperating with the eccentric roller aforesaid, a dog carried by the said actuating-lever for engagement with the ratchet-wheel of the drum to cause rotation of the drum, spring means for holding the dog and actuating-lever in coöperating relation with adjacent parts, a regulator-bar coöperating with the actuating-lever to adjust the position of the latter relative to the eccentric roller so as to cause even feeding of the fertilizer by the carrier, a contact-bar for engagement by the carrier to actuate the regulator-bar, a spool upon the driven shaft, connecting means between the carrier and the spool upon the positively-driven shaft for reversing the movement of the carrier to cause unwinding of same from the drum, and clutch means for causing rotation of the spool to reverse the movement of the carrier.

In testimony whereof we affix our signatures in presence of two witnesses.

OTTO W. SIEBENHAAR. [L. S.]
LOUIS E. SIEBENHAAR. [L. S.]

Witnesses:
C. H. MARCHEND,
FRANK BOWE.